US007100564B1

(12) United States Patent
Cannata

(10) Patent No.: US 7,100,564 B1
(45) Date of Patent: Sep. 5, 2006

(54) VARIABLE ANGLE CAM-DRIVE ENGINE AND A POWER CONVERSION MECHANISM FOR USE THEREIN

(75) Inventor: Antonio Cannata, London (CA)

(73) Assignee: Attegro Inc., London (CA)

(*) Notice: Subject to any disclaimer, the term of this patent is extended or adjusted under 35 U.S.C. 154(b) by 0 days.

(21) Appl. No.: 11/182,945

(22) Filed: Jul. 18, 2005

(51) Int. Cl.

| | |
|---|---|
| ***F02B 75/32*** | (2006.01) |
| ***F16H 25/08*** | (2006.01) |
| ***F16H 21/16*** | (2006.01) |
| *F02B 75/18* | (2006.01) |

(52) U.S. Cl. ...................... 123/197.1; 123/56.1; 74/25; 74/55

(58) Field of Classification Search ............... 123/56.1, 123/56.2, 197.1; 74/25, 53–56
See application file for complete search history.

(56) References Cited

U.S. PATENT DOCUMENTS

| | | | |
|---|---|---|---|
| 3,991,736 A | 11/1976 | Spellman | 123/197 R |
| 4,433,596 A | 2/1984 | Scalzo | 74/839 |
| 4,454,779 A | 6/1984 | Vos | 74/60 |
| 4,462,345 A | 7/1984 | Routery | 123/58 C |
| 4,475,495 A | 10/1984 | Lydell | 123/197 AB |
| 5,450,823 A | 9/1995 | Istomin | 123/56.3 |
| 5,782,219 A | 7/1998 | Frey et al. | 123/56.3 |
| 6,164,252 A | 12/2000 | Kuhn et al. | 123/56.3 |

*Primary Examiner*—Noah P. Kamen
(74) *Attorney, Agent, or Firm*—Vincent Patent Agency; Robert A. Vincent

(57) ABSTRACT

A variable angle cam-drive engine in which the torque output generated at a given engine speed (as represented by, for example, piston reciprocation frequency) can be varied by changing the operating angle of cam mechanisms in a power conversion mechanism of the engine. A power conversion mechanism, having a plurality of cam mechanisms and a cam-angle mechanism, for use in a variable angle cam-drive engine that can vary the torque output generated at a given engine speed by changing the cam-angle of the plurality of cam mechanisms using the cam-angle mechanism.

19 Claims, 11 Drawing Sheets

150 100 184 154 110 154 156 160 116 110 154 186 112 182 114 180 154 152

VARIABLE ANGLE CAM-DRIVE ENGINE AND A POWER CONVERSION MECHANISM FOR USE THEREIN

FIELD OF INVENTION

The present invention relates to the field of engines. In particular, to a variable angle cam-drive engine and a power conversion mechanism for use therein.

BACKGROUND

Conventional reciprocating piston engines use a crankshaft to convert the reciprocating motion of the pistons to rotating motion of an output shaft. Torque generation in this type of engine is less than optimal as the point of peak pressure in a cylinder (usually shortly after top-dead-center) coincides with a geometry (i.e. an angular relationship) between a connecting rod (connecting the piston to the crankshaft) and the crankshaft that is inefficient for converting the force delivered along the connecting rod to an angular displacement of the crankshaft.

Many commonly used engines such as those typically installed in automobiles and trucks, for example, have the characteristic of generating more torque as engine speed increases, while the loads in these applications would benefit from more torque at low engine speeds. Vehicle manufactures typically employ a gear box (a.k.a. transmission) to enable the generation of more torque at lower engine speeds. The inclusion of the gear box adds to the cost, weight and complexity of the vehicle.

What is needed is a solution that provides significant torque at low engine speeds while mitigating cost, weigh and complexity.

SUMMARY OF INVENTION

A variable angle cam-drive engine in which the torque output generated at a given engine speed (as represented by, for example, piston reciprocation frequency) can be varied by changing the operating angle of cam mechanisms in a power conversion mechanism of the engine. A power conversion mechanism, having a plurality of cam mechanisms and a cam-angle mechanism, for use in a variable angle cam-drive engine that can vary the torque output generated at a given engine speed by changing the cam-angle of the plurality of cam mechanisms using the cam-angle mechanism.

In accordance with one aspect of the present invention, there is provided a cam-drive engine comprising: a cylinder assembly for generating power in a reciprocating member; a power conversion mechanism having: a cam-drive mechanism for converting power in the reciprocating member to power in a rotating member; and a cam-angle mechanism for varying a cam-angle associated with the cam-drive mechanism; wherein varying the cam-angle, for a given frequency of reciprocation of the reciprocating member, produces different speeds of rotation and torque in the rotating member.

In accordance with another aspect of the present invention, there is provided a power conversion mechanism for use in a cam-drive engine having a cylinder assembly for generating power in a reciprocating member, the power conversion mechanism comprising: a cam-drive mechanism for converting power in the reciprocating member to power in a rotating member; and a cam-angle mechanism for varying a cam-angle associated with the cam-drive mechanism; wherein varying the cam-angle, for a given frequency of reciprocation of the reciprocating member, produces different speeds of rotation and torque in the rotating member.

In accordance with still another aspect of the present invention, there is provided a cam-drive engine comprising: a cylinder assembly having a cylinder, a piston for reciprocation within the cylinder and a connecting rod connected for reciprocation with the piston; and a power conversion mechanism having: a cam carrier arranged for rotation about the connecting rod; a plurality of cam mechanisms connected to the cam carrier; a first and a second cam follower each engaging at least one of the plurality of cam mechanisms; a first and a second one-way bearing each connecting the respective cam follower to the connect rod for rotation about the connecting rod and arranged to convert reciprocation of the connecting rod into rotation of the cam carrier, and a cam-angle mechanism varying, response to a control signal, a cam-angle formed between each of the plurality of cam mechanisms and the axis of reciprocation of the connecting rod; wherein varying the cam-angle, for a given frequency of reciprocation of the connecting rod, produces different speeds of rotation and torque in the cam carrier.

In accordance with yet another aspect of the present invention, there is provided a power conversion mechanism for use in a cam-drive engine having a cylinder, a piston for reciprocation within the cylinder and a connecting rod connected for reciprocation with the piston, the power conversion mechanism comprising: a cam carrier arranged for rotation about the connecting rod; a plurality of cam mechanisms connected to the cam carrier, a first and a second cam follower each engaging at least one of the plurality of cam mechanisms; a first and a second one-way bearing each connecting a respective cam follower to the connect rod for rotation about the connecting rod and arranged to convert reciprocation of the connecting rod into rotation of the cam carrier; and a cam-angle mechanism varying, response to a control signal, a cam-angle formed between each of the plurality of cam mechanisms and the axis of reciprocation of the connecting rod; wherein varying the cam-angle, for a given frequency of reciprocation of the connecting rod, produces different speeds of rotation and torque in the cam carrier.

Other aspects and features of the present invention will become apparent to those ordinarily skilled in the art or science to which it pertains upon review of the following description of specific embodiment of the invention in conjunction with the accompanying figures.

BRIEF DESCRIPTION OF DRAWINGS

The present invention will be described in conjunction with drawings in which.

DETAILED DESCRIPTION

Figure 1:
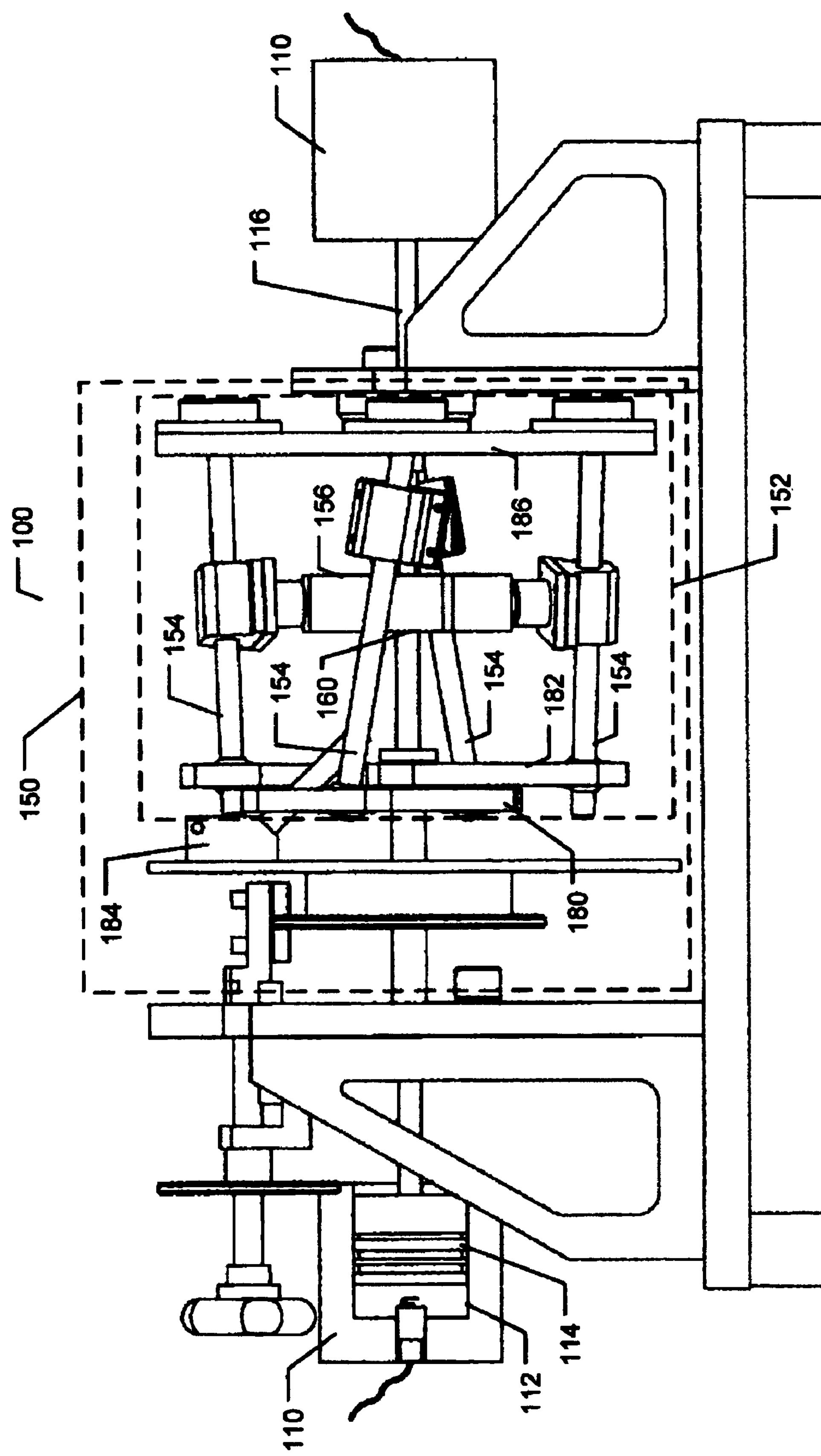
FIG. 1 is a side view of an exemplary embodiment of an engine according the present invention.
Figure 2:
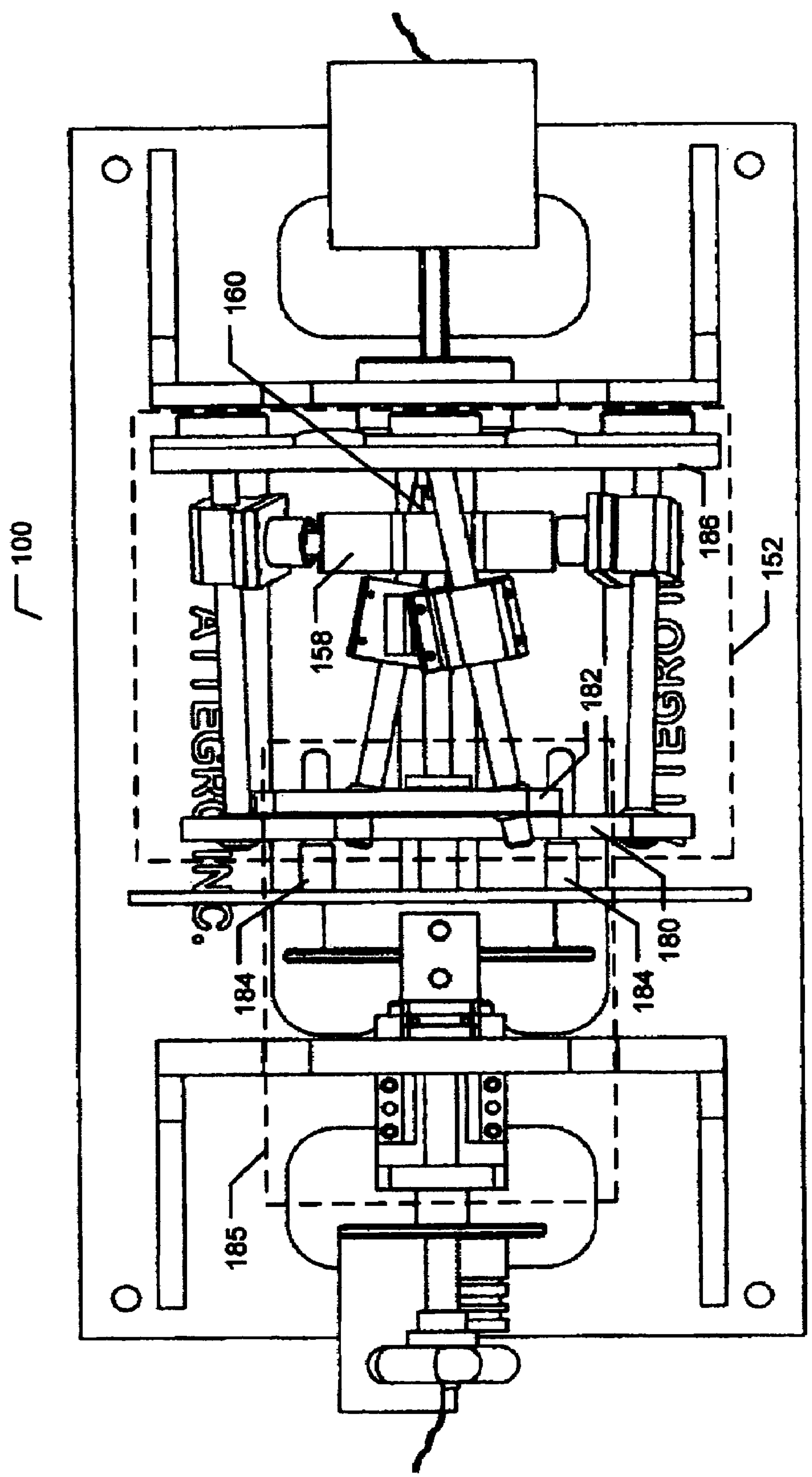
FIG. 2 is a top view of an exemplary embodiment of an engine according the present invention.
Figure 3A:
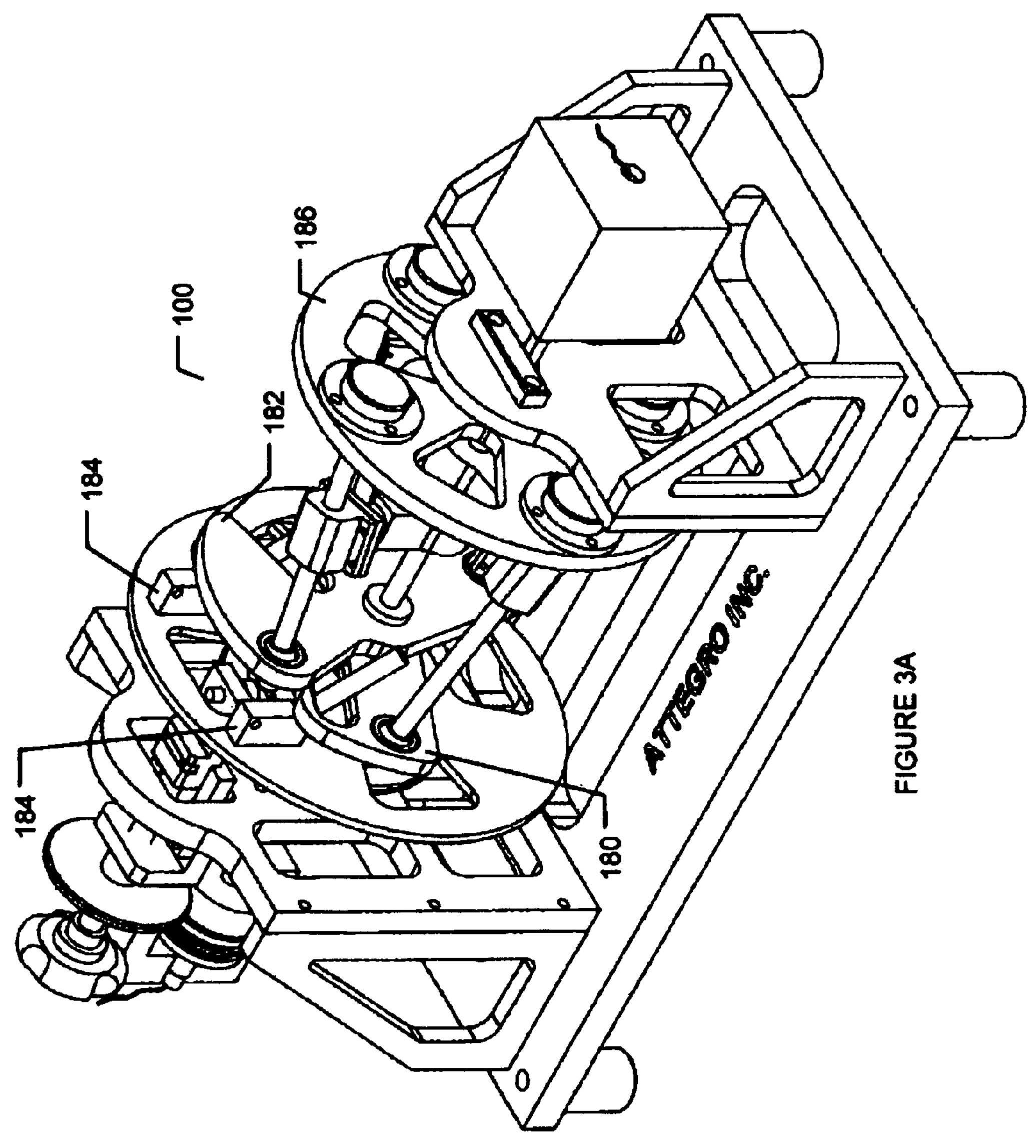
FIGS. 3A and 3B are isometric views of an exemplary embodiment of an engine according the present invention illustrating different cam-angles.
Figure 3B:
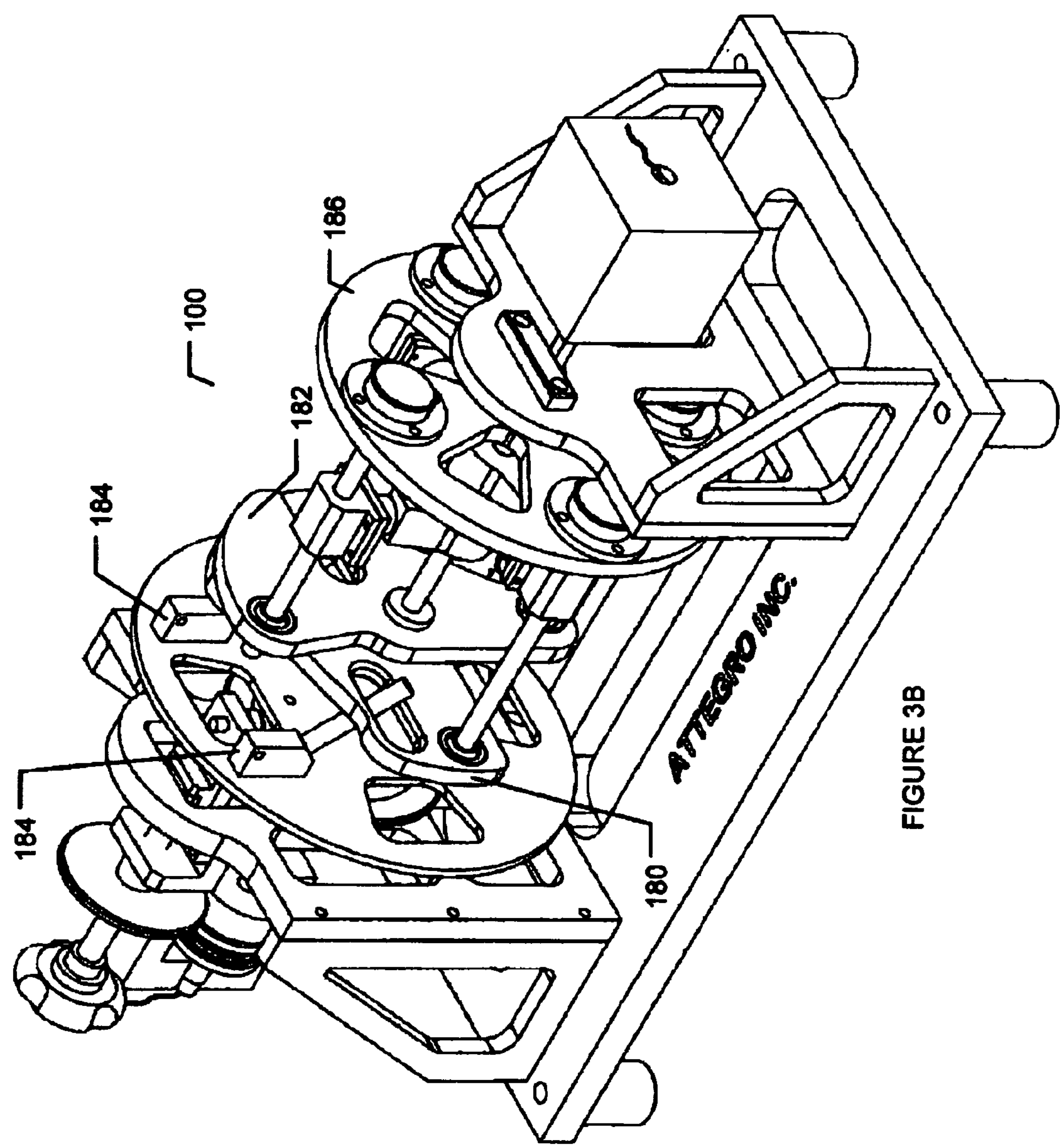

FIGS. 1, 2 and 3A & B are side, top and isometric views, respectively, of an exemplary embodiment of an engine 100 according the present invention. The engine 100 comprises a pair of cylinder assemblies 110 (one shown in partial cross-section for clarity) and a power conversion mechanism 150. Each cylinder assembly 110 comprises a cylinder 112 having a piston 114 for reciprocation therein. A connecting rod 116 couples the two pistons 114 so that they reciprocate in unison. The cylinder assemblies 110 are connected (not shown) to a main supporting structure 170 such that the cylinders 112 remain relatively stationary as the pistons 114 reciprocate.

The engine 100 illustrated in FIGS. 1, 2 and 3A & B is simplified for clarity in presenting the inventive concept of the present invention and therefore does not illustrate some conventional engine components. Ancillary mechanisms that a person skilled in the art of engines would know to use to form and operate an engine (e.g. induction system, exhaust system, fuel delivery system, ignition system, etc) are not shown. The engine 100 of the present invention can be an internal combustion engine (e.g. Otto or Diesel type) or an external combustion engine (e.g. a Watt stream engine). In an alternative embodiment the engine 100 according to the present invention can have one or more than two cylinder assemblies 110.

The power conversion mechanism 150 comprises a cam carrier 152 for relative rotation about the connecting rod 116, a plurality of cam mechanisms 154 connected to the cam carrier 152 and a first and a second cam follower 156, 158. Each of the first and second cam followers 156, 158 is a member arranged to engage with two of the cam mechanisms 154 and is connected, via a one-way clutch 160 (e.g. a Sprague clutch; and a.k.a. an overrunning clutch), to the connecting rod 116. The cam mechanisms 154 are preferably arranged in pairs, with the two members of each pair located substantially diametrically opposed on the cam carrier 152. Alternating pairs of cam mechanisms 154 are arranged so that one cam mechanism 154 in a first pair is oriented at a given angle relative to the axis of reciprocation of the connecting rod 116 while one cam mechanism 154 in a second pair, adjacent to the cam mechanism 154 in the first pair, is oriented at an opposite angle (i.e. same value, opposite sign) relative to the axis of reciprocation of the connecting rod 116. The remaining two cam mechanisms 154, one in each of the two pairs, are also adjacent and arranged in a similar orientation.

In an alternative embodiment of the engine 100 of the present invention, each cam follower 156, 158 can engage with one cam mechanism 154 or alternatively with more than two cam mechanisms 154 while remaining within the spirit and scope of the present invention.

Figure 4:
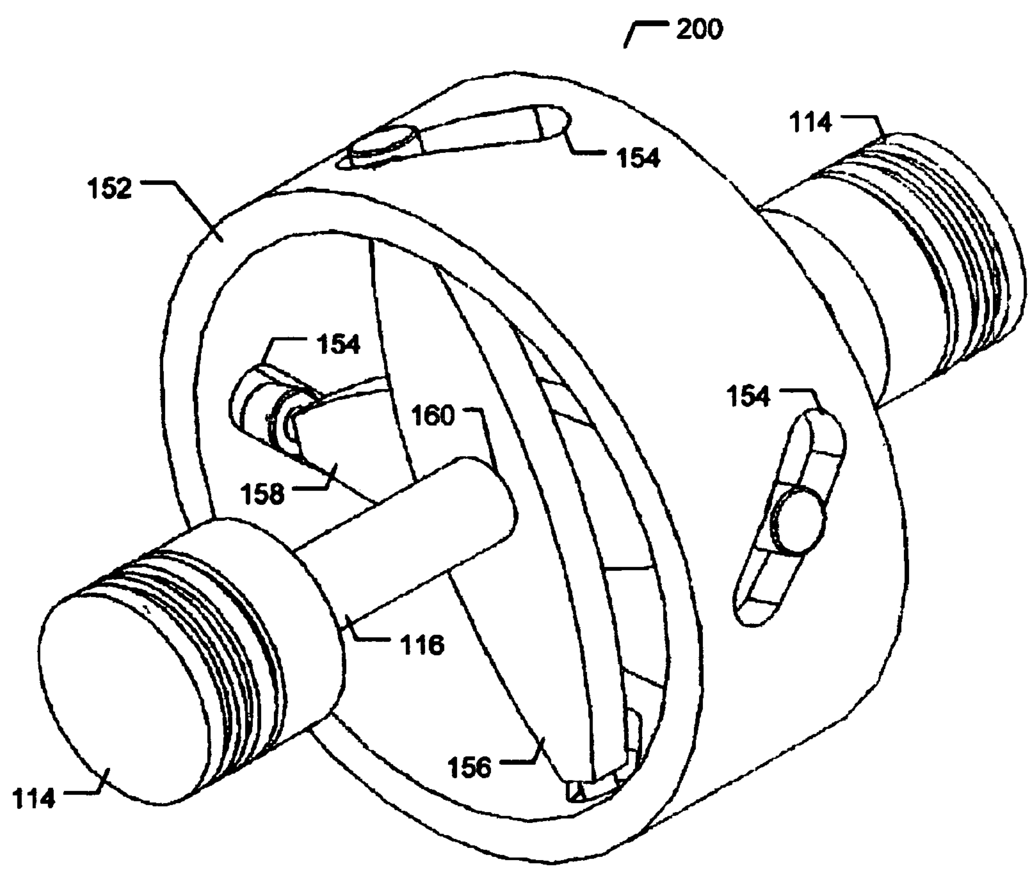
FIG. 4 is an isometric view of an exemplary partial engine in accordance with the present invention.
Figure 5A:
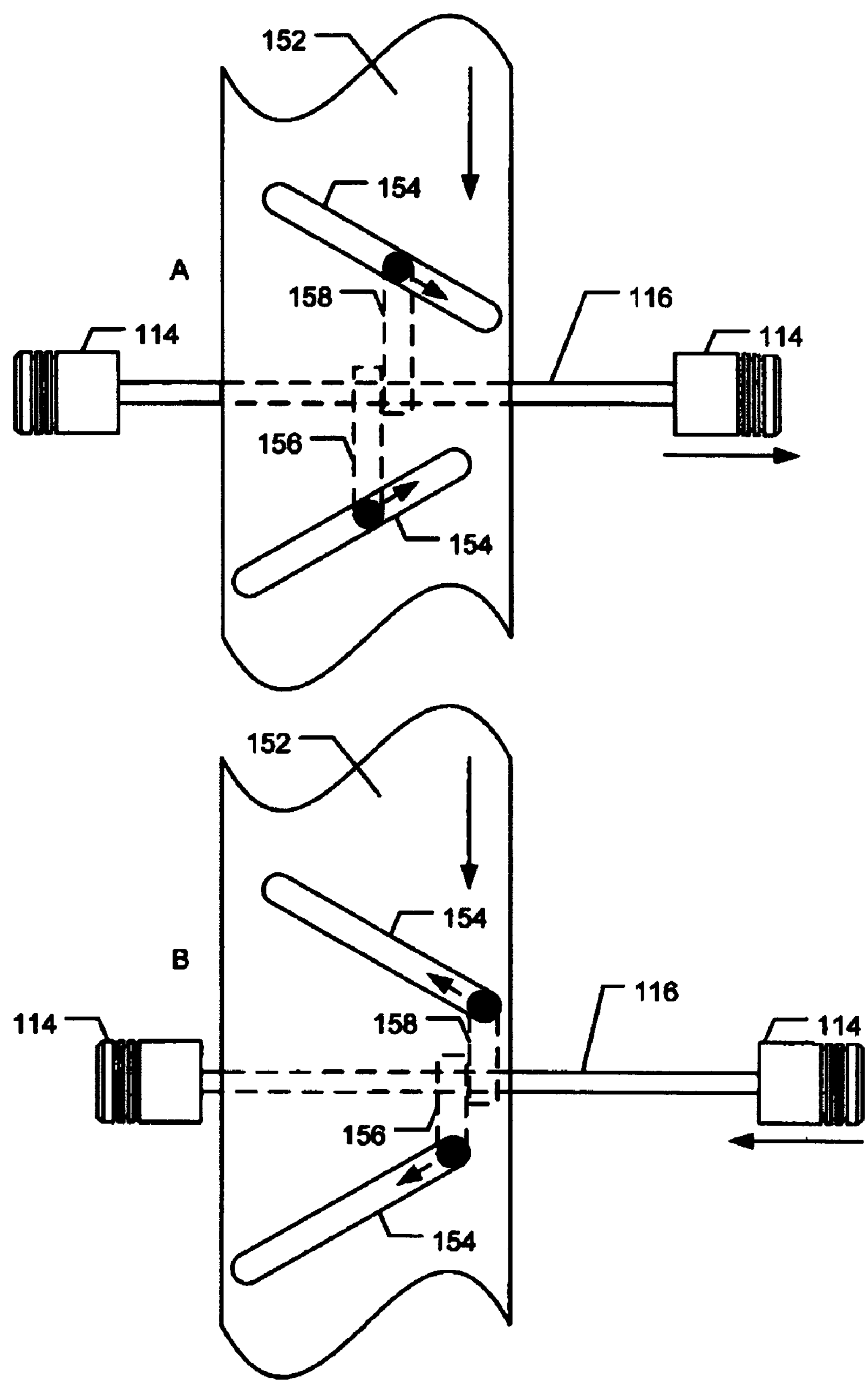
FIGS. 5A and 5B represent a time sequence of views of the exemplary partial engine of FIG. 4.
Figure 5B:
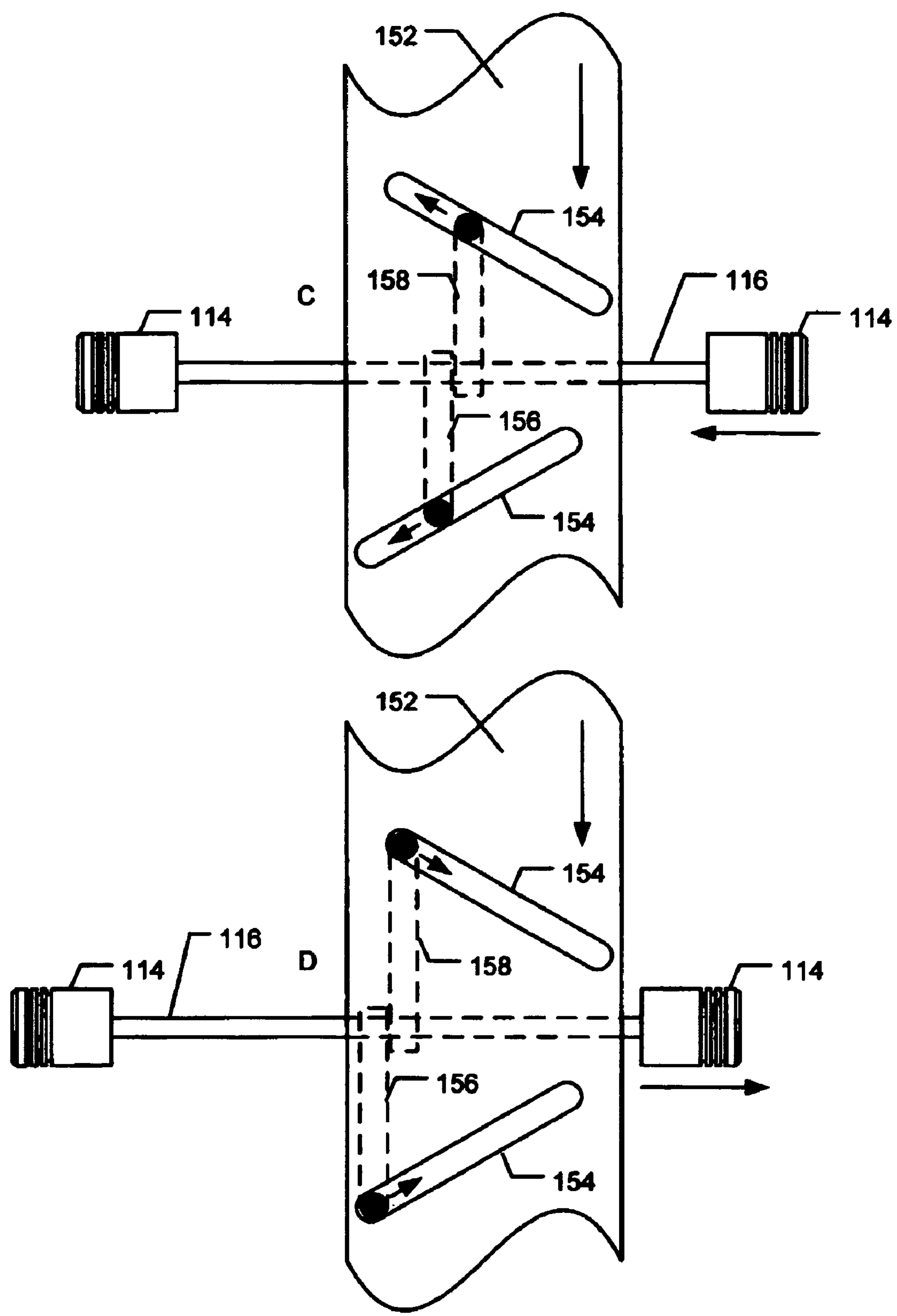

FIG. 4 is an isometric view of an exemplary partial engine 200 which will be used to describe the conversion from reciprocating motion of the pistons 114 and connecting rod 116 to rotating motion of the cam carrier 152 according to the present invention. The cam carrier 152, cam mechanisms 154, cam followers 156, 158, one-way clutches 160, connecting rod 116, and pistons 114 of the partial engine 200 function in substantially the same manner as the corresponding components in the engine 100 of the present invention as described above with reference to FIGS. 1–3A & B. FIGS. 5A and 5B are schematic representations of the partial engine 200 presented in four side views labeled A, B, C and D. The four views represent a time sequence of views all taken from a perspective that follows a portion of the cam carrier 152 as it rotates.

When the partial engine 200 is in operation, the pistons 114 together with the connecting rod 116 reciprocate in a first lateral direction (e.g. left-to-right in FIG. 5A view A), then in a second (opposite) lateral direction (e.g. right-to-left in FIG. 5A view B and FIG. 5B view C) and this cycle is repeated (e.g. starting left-to-right in FIG. 5B view D). Cam followers 156 and 158 also move laterally left-to-right and right-to-left as they are attached to the connecting rod 116 by one-way clutches 160 (not shown in FIGS. 5A and 5B). The cam followers 156 and 158 engage respective cam mechanisms 154. The one-way clutches connected to cam followers 156, 158 are arranged so that when the connecting rod 116 moves in the first lateral direction (e.g. left-to-right in FIG. 5A view A) the one-way clutch connected to cam follower 156 is locked (i.e. does not allow rotation of cam follower 156 relative to connecting rod 116) while the one-way clutch connected to cam follower 158 free-wheels (i.e. does allow rotation of cam follower 158 relative to connecting rod 116). When the connecting rod 116 moves in the second lateral direction (e.g. right-to-left in FIG. 5A view B and FIG. 5B view C) the one-way clutch 160 connected to cam follower 156 free-wheels while the one-way clutch connected to cam follower 158 is locked. Connecting rod 116 is preferably arranged to prevent it from rotating during reciprocation. Each of the cam followers 156, 158 alternately causes the cam carrier 152 to rotate in the same direction (e.g. from the top to the bottom of the page in FIGS. 5A and 5B) when its corresponding one-way clutch 160 is locked. This operation is provided for by arranging the cam mechanisms 154 that engage with cam follower 156 to have an angle relative to the axis of reciprocation of the connecting rod 116 (herein after a cam-angle) that is opposite to a cam-angle of the cam mechanisms 154 that engage cam follower 158. The foregoing description of the operation of engine partial 200 with reference to FIGS. 5A and 5B applies equally to engine 100 according to the present invention and the corresponding components that comprise the engine 100.

In an alternative embodiment of the engine 100 the one-way clutches 160 can be arranged to operate in the opposite orientation to that described above in which case the cam carrier 152 would rotate in the direction that appears to be from the bottom of the page to the top of the page in FIGS. 5A and 5B. In yet a further alternative embodiment the cam-angle of each of the cam mechanisms 154 can be reversed with respect to the description above in which case the cam carrier 152 would rotate in the direction that appears to be from the bottom of the page to the top of the page in FIGS. 5A and 5B.

The cam carrier 152 can be connected to a conventional power transfer mechanism (not illustrated) such as, for example, a gear set, gears and chain, pulleys and belt and other similar mechanisms for transferring (i.e. outputting) the power generated by the engine 100.

Referring again to FIGS. 1, 2 and 3A & B, in the engine 100 of the present invention the cam-angle of the cam mechanisms 154 is adjustable. The power conversion mechanism 150 has a cam-angle mechanism 185 comprising two adjustable plates 180, 182 forming one end of the cam carrier 152 and an angle control fork 184. The two adjustable plates 180, 182 are arranged adjacent one and other, substantially orthogonal to the axis of reciprocation of the connecting rod 116 and free to rotate about the connecting rod 116 independently of one and other. Cam mechanisms 154 are preferably arranged in substantially diametrically opposed pairs. One end of each cam mechanism 154 in a first pair is connected to one adjustable plate 180, the other ends of the cam mechanisms 154 are connected to an end plate 186. One end of each cam mechanism 154 in another pair is connected to the other adjustable plate 182, the other ends of the cam mechanisms 154 are connected to the end plate 186. Adjustable plate 182 that is relatively proximate to the end plate 186 is formed to permit substantially unobstructed access to adjustable plate 180 by the pair of cam mechanisms 154 connected thereto. The angle control fork 184 is movable, back and forth, along the axis of reciprocation of the connecting rod 116. The angle control fork 184 has a first tine that extends through an aperture in adjustable plate 180 and a second tine that extends through an aperture in adjustable plate 182. The apertures in the adjustable plates 180, 182 and the first and second tines are arranged so that movement of the angle control fork 184 along the axis of reciprocation of the connecting rod 116 causes the adjustable plates 180, 182 to rotate relative to each other. The ends of the cam mechanisms 154 connected to adjustable plate 180 move closer or further away form the ends of the cam mechanisms 154 connected to adjustable plate 182 as the adjustable plates 180, 182 rotate relative to each other. The other ends of the cam mechanisms 154 attached to end plate 186 remain relatively stationary one to the other. Thereby, the angle of the cam mechanisms 154 relative to the axis of reciprocation of the connecting rod 116 (i.e. the cam-angle) changes as the angle control fork 184 is moved, back and forth, along the axis of reciprocation of the connecting rod 116. FIG. 3A represents the cam mechanisms 154 at a smaller cam-angle and FIG. 3B at a larger cam-angle (each relative to the axis of reciprocation of the connecting rod 116) resulting from operation of the cam-angle mechanism 154 as described above.

The cam-angle mechanism 185 varies the cam-angle responsive to a control signal which can be, for example, a mechanical, a hydraulic, an electrical, a pneumatic and other similar control signals.

Figure 6:
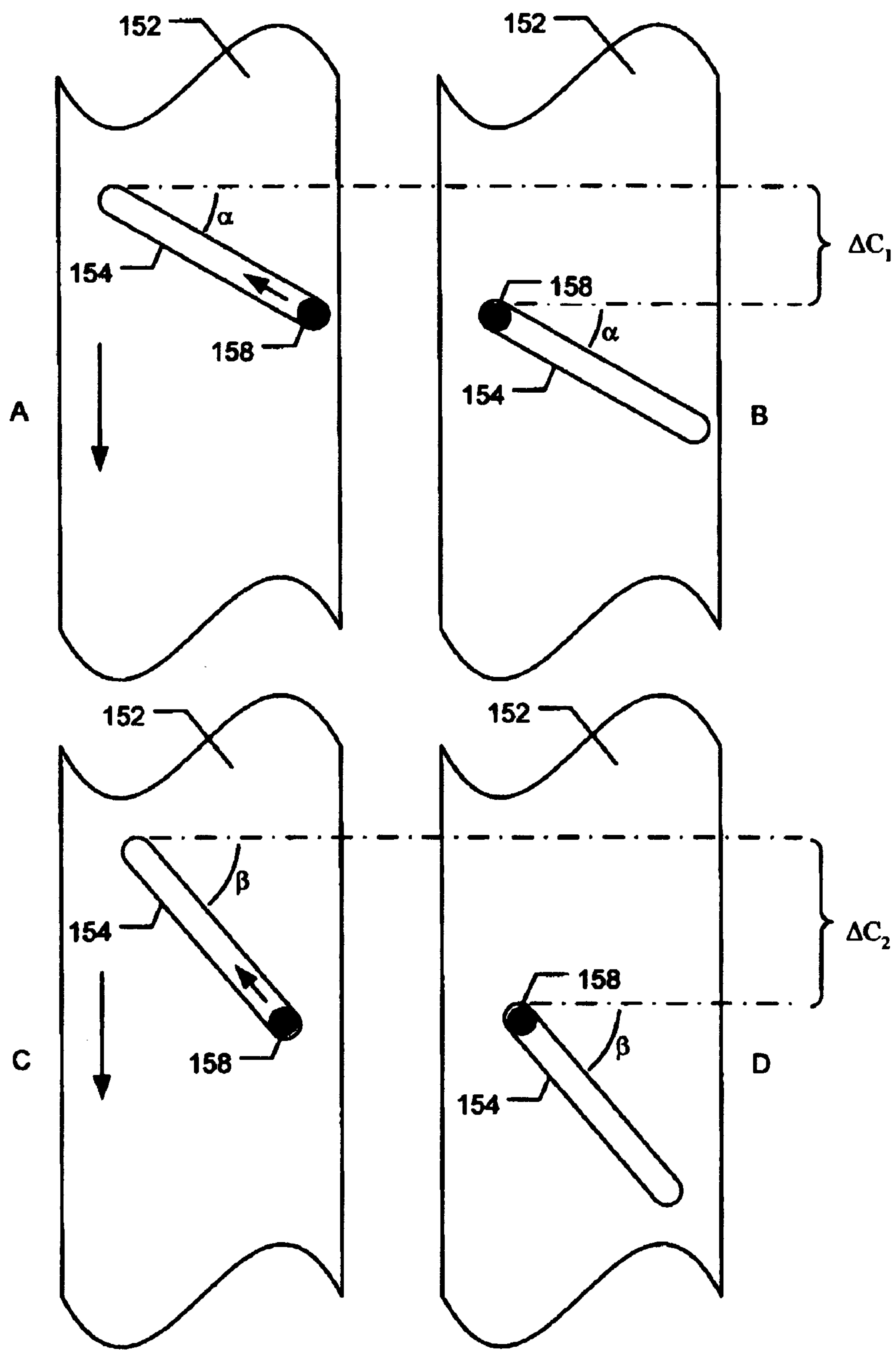
FIG. 6 is a schematic representation of effect of two different cam-angles on the displacement of a cam carrier according to the present invention.

As the cam-angle is varied the relationship between a number of reciprocations of the connecting rod 116 per one rotation of the cam carrier 152 will vary as well. FIG. 6 is a schematic representation of the effect of two different cam-angles on the displacement of the cam carrier 152 (only a portion of cam carrier 152 is illustrated in FIG. 6). View A shows cam follower 158 starting to move to the left from the right end of the cam mechanism 154 for a given cam-angle $\alpha$. View B shows cam follower 158 as it arrives at the left end of the cam mechanism 154 for the same cam-angle $\alpha$. The displacement of cam follower 158 between View A and View B corresponds to one full stroke of the pistons 114 and the connecting rod 116. Views A and B are arranged so that the vertical position (in the drawing sheet) of the cam follower 158 is constant. The circumferential displacement of cam follower 152 corresponding to one full stroke of pistons 114 and connecting rod 116, for cam-angle $\alpha$, is represented by $\Delta C_1$. Views C and D show cam follower 158 starting to move to the left from the right end of the cam mechanism 154 and cam follower 158 as it arrives at the left end of the can mechanism 154 for a given cam-angle $\beta$, respectively. The circumferential displacement of cam follower 152 corresponding to one full stroke of pistons 114 and connecting rod 116, for cam-angle $\beta$ (that is relatively larger than $\alpha$), is represented by $\Delta C_2$. By comparing $\Delta C_1$ and $\Delta C_2$, it can be seen that the circumferential displacement of cam follower 152 corresponding to one full stroke of pistons 114 and connecting rod 116 increases as a function of increasing cam-angle.

FIG. 6 and the above description represent only cam follower 158 for clarity of the illustration and description. It will be understood that the cam follower 156 operates in a manner similar to that described for cam carrier 158. Operation of cam follower 156 is preferably in an opposite orientation to that of cam follower 158 and operation of the two cam followers can be concurrent.

When the cam-angle is substantially zero, reciprocation of the connecting rod 116 will not cause the cam carrier 152 to rotate. In the absence of external forces acting on the cam carrier 152 and after the extinction of any previous rotational momentum, the speed of rotation of the cam carrier 152 will be zero when the cam-angle is zero.

Figure 9:
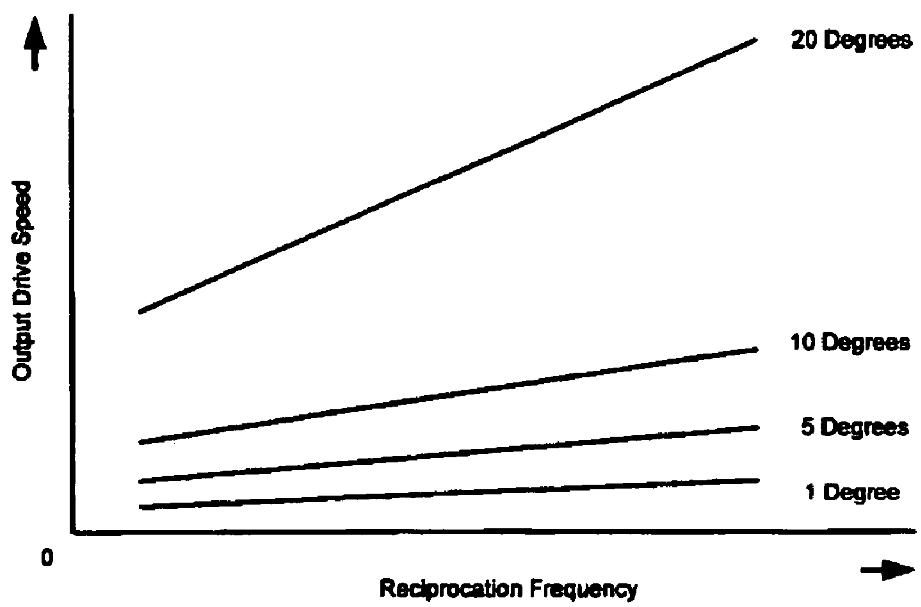
FIG. 9 is a graphical representation of the output drive speed versus reciprocation frequency characteristic of an exemplary engine according to the present invention.

The number of power strokes of the engine 100 is a direct function of the number of reciprocations of the connecting rod 116. In the case where the cam-angle is zero (i.e. coincides with the axis of reciprocation of the connecting rod 116), the cam carrier 152 does not rotate regardless of the number of reciprocations of the connecting rod 116. As the cam-angle is varied away from zero, the number of rotations of the cam carrier 152 is s=all relative to a given number of connecting rod 116 reciprocations. As the cam-angle is increased, the number of rotations of the cam carrier 152 increases for the same given number of connecting rod 116 reciprocations. FIG. 9 is a graphical representation of the output drive speed versus reciprocation frequency characteristic of an exemplary engine 100 according to the present invention. The output drive speed (i.e. the rotational speed of the cam carrier 152) is higher for a given reciprocation frequency, of the connecting rod 116, for a larger cam-angle. Representative characteristic functions for cam-angles of 1, 5, 10 and 20 degrees are illustrated. It will be understood that the engine 100 can be operated at greater, lesser and intermediate cam-angles and that the characteristic functions are only representative. The actual characteristic functions will depend on many specific parameters (e.g. bore, stroke and number of cylinders; engine type; operating cycle; etc.) of a particular embodiment of the engine 100 according to the present invention while the general characteristic function as illustrated in FIG. 9 is representative of the actual characteristic function.

Varying the cam-angle in the range of greater than 0 to less than 90 degrees will vary the relationship between the frequency of reciprocation of the connecting rod 116 and the rotational speed of cam carrier 152. When the cam-angle is near 0, the speed of rotation is relatively lower for a given frequency of reciprocation. As the cam-angle is increased, the speed of rotation increases for the same frequency of reciprocation. Observing the same relationship from a different perspective; for a given rotational speed, a small cam-angle requires a relatively higher reciprocation frequency and as the cam-angle increases the required reciprocation frequency decreases. As the number of power strokes of the engine 100 is a scalar function of the reciprocation frequency, the number of power strokes, for a given rotational speed, increases as the cam-angle decreases and vice versa.

Varying the angle in the range of greater than zero to less than −90 degrees results in the same relationships as described above except that the direction of rotation is reversed.

Figure 10:
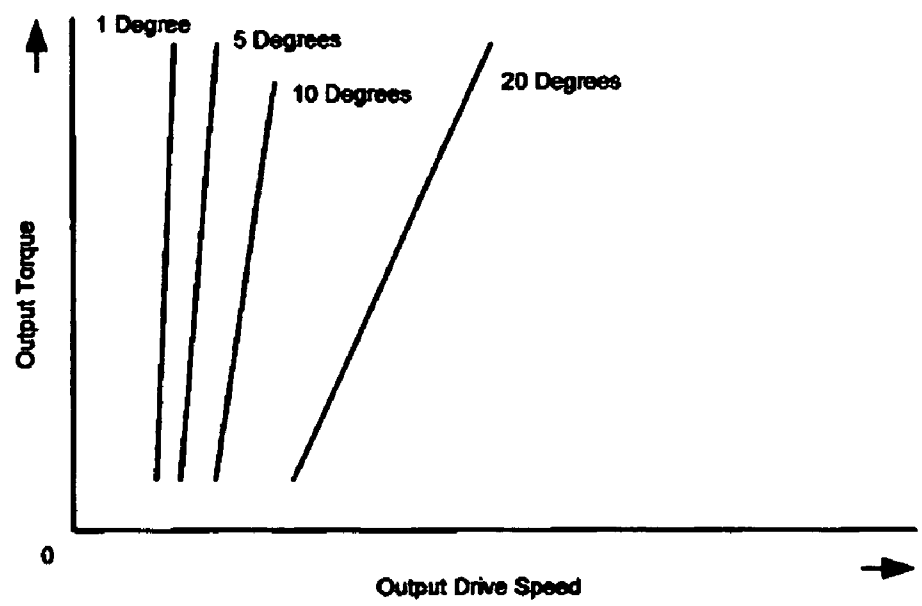
FIG. 10 is a graphical representation of the output torque versus output drive speed characteristic of an exemplary engine according to the present invention.

The torque imparted to the cam carrier 152 is also a function of the cam-angle. When the cam-angle is small the large number of the connecting rod 116 reciprocations per rotation of the cam carrier 152 generates relatively higher torque while the smaller number of connecting rod 116 reciprocations per rotation of the cam carrier 152 at a larger angle generates relatively lower torque. The effect is similar to having a larger number of cylinders (i.e. greater total engine displacement) in a conventional crankshaft engine at small cam-angles and having a smaller number of the cylinders at larger cam-angles. FIG. 10 is a graphical representation of the output torque versus output drive speed characteristic of an exemplary engine 100 according to the present invention. The output torgue (i.e. the torque at the cam carrier 152) is higher for a given output drive speed (i.e. the rotational speed of the cam carrier 152) for a smaller cam angle. Representative characteristic functions for cam-angles of 1, 5, 10 and 20 degrees are illustrated. It will be understood that the engine 100 can be operated at greater, lesser and intermediate cam-angles and that the characteristic functions are only representative. The actual characteristic functions will depend on many specific parameters (e.g. bore, stroke and number of cylinders; engine type; operating cycle; etc.) of a particular embodiment of the engine 100 according to the present invention while the general characteristic function as illustrated in FIG. 10 is representative of the actual characteristic function.

Figure 7:
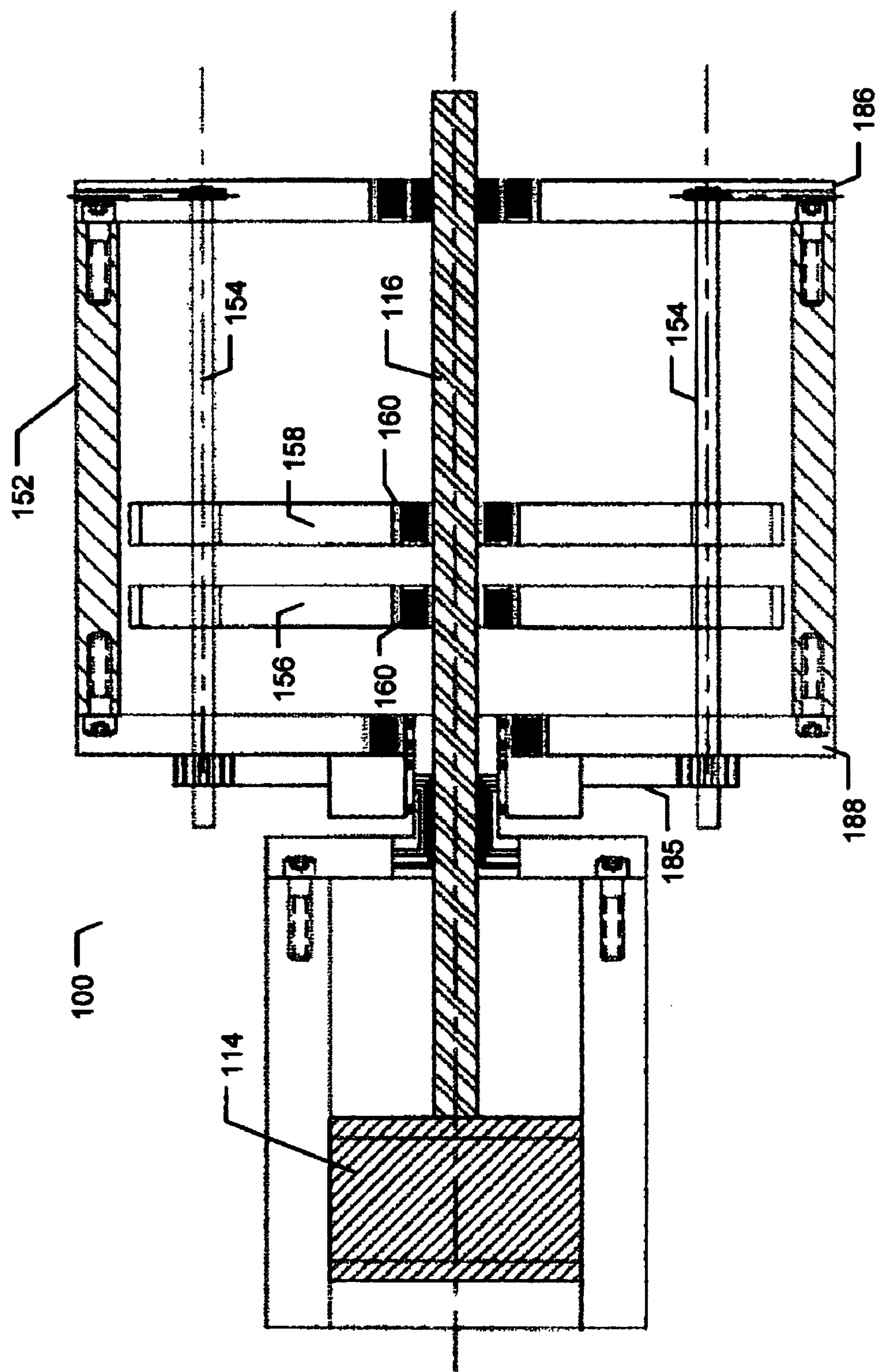
FIG. 7 is a side view of an alternative exemplary embodiment of an engine according the present invention.
Figure 8:
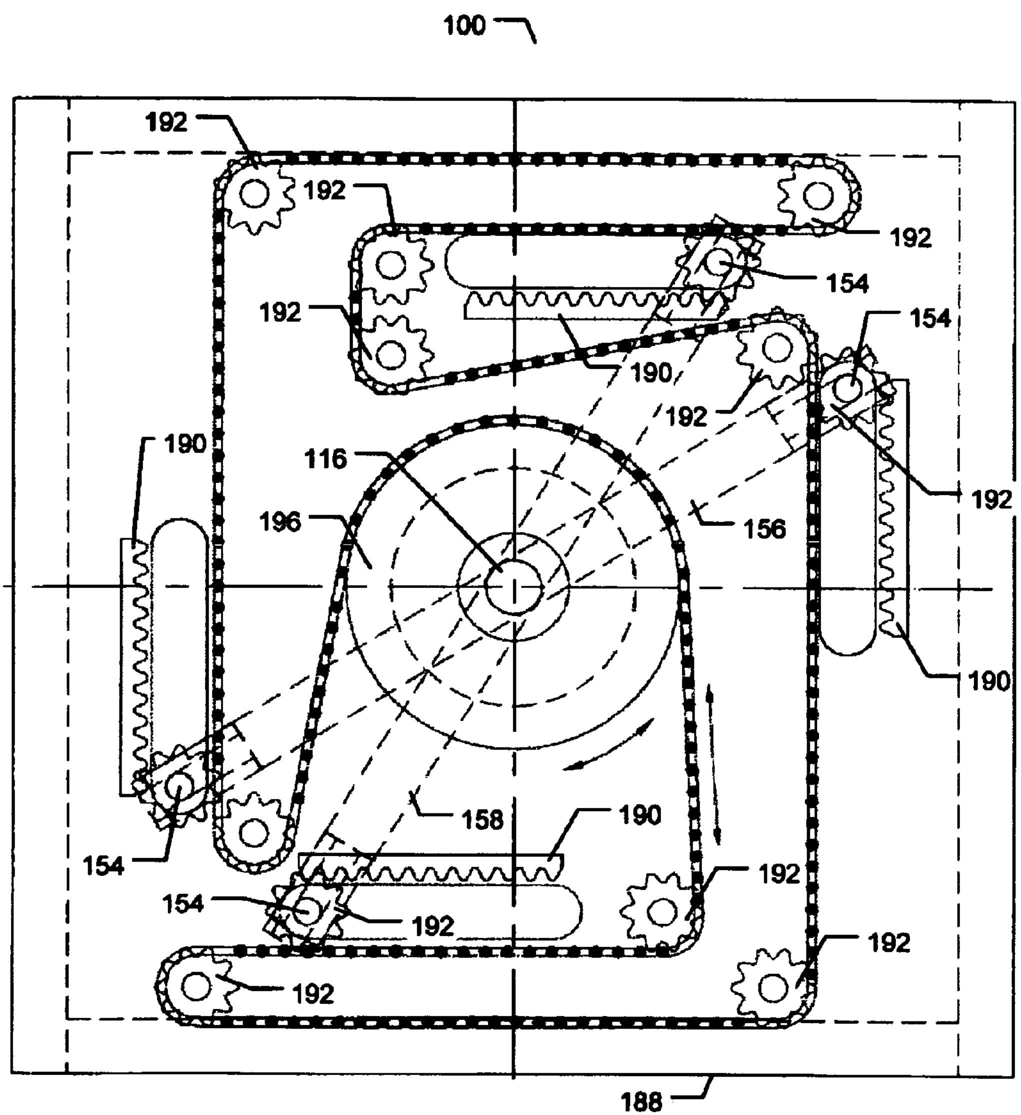
FIG. 8 is an end view of the alternative exemplary embodiment of an engine of FIG. 7.

FIGS. 7 and 8 are side (in partial cross-section) and end views of an alternative embodiment of the engine 100 of the present invention comprising a cam carrier 152 having a pair of end plates 186, 188 and a cam-angle mechanism 185. Each of the cam mechanisms 154 is arranged so that one end is pivotally connected to end plate 186 and another end is connected to end plate 188 via the cam-angle mechanism 185. The cam mechanisms 154 are arranged in diametrically opposed pairs; each pair engages a cam follower. In the illustrated embodiment there are two pairs of cam mechanisms 154 each pair engaging a different one of the two cam followers 156, 158. Each of the cam mechanisms 154 in a pair is oriented at the same cam-angle with respect to the axis of reciprocation of the connecting rod 166. Each of the cam mechanisms 154 in the other pair is oriented at a cam-angle having the same numeric value but the opposite sign.

The cam-angle mechanism 185 can vary the cam-angle of each of the cam mechanisms 154 by causing a first end of the cam mechanism 154 to move relative to a second end of the cam mechanism 154. A first end of each cam mechanism 154 is pivotally fixed to end plate 188 via cam-angle mechanism 185. The first end of each cam mechanism 154 is movable relative to a second end of each cam mechanism 154 that is fixed relative to end plate 186. In an alternative embodiment, both ends of the cam mechanism 154 can be movable and there can optionally be a fixed pivot point disposed between the two ends of the cam mechanism 154.

The cam-angle mechanism 185 can vary the cam-angle between a first limit-angle greater than or equal to zero and a second limit-angle that is less than 90 degrees. In an alternate embodiment of the engine 100 of the present invention, the cam-angle mechanism 185 can vary the cam-angle between a first limit-angle greater than −90 and a second limit-angle less than 90 degrees. In the alternative embodiment rotational direction of the cam carrier 152 can be reversed by varying the cam-angle.

The cam-angle mechanism 185 comprises a plurality of rack segments 190, a plurality of gears 192, a chain 194 and an actuator 196. A gear 192 is attached for free rotation to the first end of each cam mechanism 154. A rack segment 190 is ranged to engage each of the gears 192 at the first ends of the cam mechanisms 154. The chain 194 is arranged in a continuous loop that engages each of the gears 192 at the first ends of the cam mechanisms 154 and a number of other gears 192 that are arranged as idler gears 192 so that the chain 194 can be used to move the first ends of cam mechanisms 154, preferably in synchronous, relative to their corresponding rack segments 190. The actuator 196 can cause the chain 194 loop to rotate back and forth and stop at a given position. The actuator 196 comprises a hydraulic motor, a stepper motor, a motor and gear set mechanism, a hydraulic ram or solenoid and idler gear mechanism or other similar mechanisms that provide for rotation of the chain 194. As the first ends of the cam mechanisms 154 move in response to rotation of the chain 194 loop the cam-angle of each cam mechanism 154 changes. The cam-angle mechanism 185 is arranged so that as the cam-angle of one pair of cam mechanisms 154 changes in one direction the cam-angle of the other pair of cam mechanisms 154 changes in the opposite direction. For example, as the cam-angle of the first pair of cam mechanisms 154 changes from 5 to 10 degrees the cam-angle of the second pair of cam mechanisms 154 changes from −5 to −10 degrees.

It will be understood that the cam-angle adjustment mechanisms 185 described above can be used to change the cam-angle while the engine 100 according to the present invention is in operation.

It will be apparent to one skilled in the art that numerous modifications and departures from the specific embodiments described herein may be made without departing from the spirit and scope of the present invention.

The invention claimed is:

1. A cam-drive engine comprising:

a cylinder assembly for generating power in a reciprocating member;

a power conversion mechanism having:

a cam-drive mechanism for converting power in the reciprocating member to power in a rotating member; and a cam-angle mechanism for varying a cam-angle associated with the cam-drive mechanism;

wherein varying the cam-angle, for a given frequency of reciprocation of the reciprocating member, produces different speeds of rotation and torque in the rotating member.

2. The cam-drive engine of claim 1, further comprising: a second cylinder assembly connected to the connecting rod for opposed operation with the cylinder assembly.

3. A power conversion mechanism for use in a cam-drive engine having a cylinder assembly for generating power in a reciprocating member, the power conversion mechanism comprising:

a cam-drive mechanism for converting power in the reciprocating member to power in a rotating member; and a cam-angle mechanism for varying a cam-angle associated with the cam-drive mechanism;

wherein varying the cam-angle, for a given frequency of reciprocation of the reciprocating member, produces different speeds of rotation and torque in the rotating member.

4. A cam-drive engine comprising:

a cylinder assembly having a cylinder, a piston for reciprocation within the cylinder and a connecting rod connected for reciprocation with the piston; and a power conversion mechanism having:

a cam carrier arranged for rotation about the connecting rod;

a plurality of cam mechanisms connected to the cam carrier;

a first and a second cam follower each engaging at least one of the plurality of cam mechanisms;

a first and a second one-way bearing each connecting the respective cam follower to the connect rod for rotation about the connecting rod and arranged to convert reciprocation of the connecting rod into rotation of the cam carrier; and a cam-angle mechanism varying, response to a control signal, a cam-angle formed between each of the plurality of cam mechanisms and the axis of reciprocation of the connecting rod;

wherein varying the cam-angle, for a given frequency of reciprocation of the connecting rod, produces different speeds of rotation and torque in the cam carrier.

5. The cam-drive engine of claim 4, wherein the cam-angle formed between the at least one of the plurality of cam mechanisms engaged by the first cam follower has the same value and opposite sign as the cam-angle formed between the at least one of the plurality of cam mechanisms engaged by the second cam follower.

6. The cam-drive engine of claim 4, wherein the first and a second cam followers each engaging a pair of the plurality of cam mechanisms.

7. The cam-drive engine of claim 4, wherein the cam-angle mechanism varies the cam-angle by moving corresponding first ends of each of the plurality of cam mechanisms while corresponding second ends of each of the plurality of cam mechanisms remain relatively fixed.

8. The cam-drive engine of claim 4, wherein the cam-angle mechanism varies the cam-angle by moving corresponding first ends and corresponding second ends of each of the plurality of cam mechanisms.

9. The cam-drive engine of claim 4, wherein the cam-angle can be varied between a first limit-angle equal to or greater than zero degrees and a second limit-angle less than 90 degrees.

10. The cam drive engine of claim 4, wherein the cam-angle can be varied between a first limit-angle greater than −90 degrees and a second limit-angle less than 90 degrees.

11. The cam-drive engine of claim 4, further comprising: a second cylinder assembly having a cylinder and a piston, for reciprocation within the cylinder, connected to the connecting rod for opposed operation with the cylinder assembly.

12. A power conversion mechanism for use in a cam-drive engine having a cylinder, a piston for reciprocation within the cylinder and a connecting rod connected for reciprocation with the piston, the power conversion mechanism comprising:

a cam carrier arranged for rotation about the connecting rod;

a plurality of cam mechanisms connected to the cam carrier;

a first and a second cam follower each engaging at least one of the plurality of cam mechanisms;

a first and a second one-way bearing each connecting the respective cam follower to the connect rod for rotation about the connecting rod and arranged to convert reciprocation of the connecting rod into rotation of the cam carrier; and a cam-angle mechanism varying, response to a control signal, a cam-angle formed between each of the plurality of cam mechanisms and the axis of reciprocation of the connecting rod;

wherein varying the cam-angle, for a given frequency of reciprocation of the connecting rod, produces different speeds of rotation and torque in the cam carrier.

13. The power conversion mechanism of claim 12, wherein the cam-angle formed between the at least one of the plurality of cam mechanisms engaged by the first cam follower has the same value and opposite sign as the cam-angle formed between the at least one of the plurality of cam mechanisms engaged by the second cam follower.

14. The power conversion mechanism of claim 12, wherein the first and a second cam followers each engaging a pair of the plurality of cam mechanisms.

15. The power conversion mechanism of claim 12, wherein the cam-angle mechanism varies the cam-angle by moving corresponding first ends of each of the plurality of cam mechanisms while corresponding second ends of each of the plurality of cam mechanisms remain relatively fixed.

16. The power conversion mechanism of claim 12, wherein the cam-angle mechanism varies the cam-angle by moving corresponding first ends and corresponding second ends of each of the plurality of cam mechanisms.

17. The power conversion mechanism of claim 12, wherein the cam-angle can be varied between a first limit-angle equal to or greater than zero degrees and a second limit-angle less than 90 degrees.

18. The power conversion mechanism of claim 12, wherein the cam-angle can be varied between a first limit-angle greater than −90 degrees and a second limit-angle less than 90 degrees.

19. The power conversion mechanism of claim 12, further comprising: a second cylinder assembly having a cylinder and a piston, for reciprocation within the cylinder, connected to the connecting rod for opposed operation with the cylinder assembly.

* * * * *